US006367295B1

(12) United States Patent
Agostini et al.

(10) Patent No.: US 6,367,295 B1
(45) Date of Patent: Apr. 9, 2002

(54) VEHICLE DOOR HANDLE

(75) Inventors: Astorre Agostini, Alpignano; Fiorenzo Savant, Collegno, both of (IT)

(73) Assignee: Valeo Sicurezza Abitacolo S.p.A., Via Asti (IT)

( * ) Notice: Subject to any disclaimer, the term of this patent is extended or adjusted under 35 U.S.C. 154(b) by 0 days.

(21) Appl. No.: 09/432,395

(22) Filed: Nov. 2, 1999

(30) Foreign Application Priority Data

Nov. 3, 1998 (IT) ........................................ T098A0925

(51) Int. Cl.[7] ................................................ B60R 25/04

(52) U.S. Cl. .......................... 70/257; 70/277; 307/10.1; 340/426

(58) Field of Search ....................... 70/264, 277, 278.1, 70/256, 257; 362/501; 307/10.1–10.3, 117; 340/825.31, 825.34, 426, 430, 542, 555, 556

(56) References Cited

U.S. PATENT DOCUMENTS

| | | | | | |
|---|---|---|---|---|---|
| 5,497,641 | A | * | 3/1996 | Linde et al. | 70/257 |
| 5,682,135 | A | | 10/1997 | LaBonde | 340/426 |
| 5,844,470 | A | * | 12/1998 | Garnault et al. | 340/426 |
| 6,075,294 | A | * | 6/2000 | Van Den Boom et al. | 307/10.1 |
| 6,093,978 | A | * | 7/2000 | Benard et al. | 307/10.2 |
| 6,218,933 | B1 | * | 4/2001 | Josserand et al. | 340/426 |
| 6,239,693 | B1 | * | 5/2001 | Benard et al. | 340/426 |

FOREIGN PATENT DOCUMENTS

| | | | |
|---|---|---|---|
| DE | 3136468 | | 3/1983 |
| DE | 4212291 | | 10/1993 |
| DE | 19752974 | | 9/1998 |
| EP | 0831194 | | 3/1998 |
| EP | 1026348 | * | 8/2000 |

* cited by examiner

*Primary Examiner*—Suzanne Dino Barrett
(74) *Attorney, Agent, or Firm*—Liniak, Berenato, Longacre & White

(57) ABSTRACT

A handle for controlling a lock of a vehicle door has a connecting structure for connection to the door; a control lever hinged to the connecting structure and gripped by a user; and a control device for setting only the one lock to a safety-off mode; the handle having a respective electric aerial, which is carried by the lever, detects an identification code carried by the user, and is connected to the control device to supply the control device with an enabling signal as the user approaches the vehicle.

9 Claims, 2 Drawing Sheets

VEHICLE DOOR HANDLE

The present invention relates to a handle for controlling a vehicle door lock.

More specifically, the present invention relates to a handle of the type comprising a connecting structure for connection to the vehicle door; a usergripped lever hinged to the connecting structure; and a presence detecting device for detecting the presence of the user's hand close to the lever, and emitting a relative presence signal.

BACKGROUND OF THE INVENTION

On known vehicles featuring handles of the above type, the various detecting devices are connected to one control unit common to all the vehicle locks, and which comprises a single detecting aerial, normally located inside the passenger compartment, and a lockrelease assembly for setting the locks to a safety-off mode.

In actual use, as the user approaches the vehicle, the aerial reads an identification code carried by the user, and supplies a signal to activate the control unit; upon one of the detecting devices on the handles detecting the presence of the user's hand close to the handle, the device sends a respective presence signal to the control unit, which, in response, instantly sets the vehicle locks to safety-off mode; at which point, the user turns the gripped lever to release the lock and open the relative doer.

Though widely used, known control units of the type described above have the drawback, upon receiving a presence signal from any one of the detecting devices, of releasing the safety devices of all the vehicle locks, thus enabling uncontrolled opening of all the doors on the vehicle. Such an operating mode should be avoided to prevent objects from being stolen from inside the vehicle by thieves who, upon the user being identified by the control unit, are automatically afforded access to the passenger compartment of the vehicle through any of the doors, in particular the rear doors.

SUMMARY OF THE INVENTION

It is an object of the present invention to provide a vehicle door handle designed to solve the above problem in a straightforward manner, and which, at the same time, is cheap and easy to produce and provides for a high degree of efficiency and reliability.

According to the present invention, there is provided a handle for controlling a lock of a vehicle door, comprising a connecting structure for connection to a supporting body of the vehicle; a movable control member connected to said connecting structure and activated, in use, by the hand of a user; and first control means for setting said lock to a safety-off mode; characterized by also comprising detecting means for detecting a user identification code and emitting a consent signal; said first control means being connected to said detecting means to set said lock to said safety-off mode upon a consent signal being received from said detecting means.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
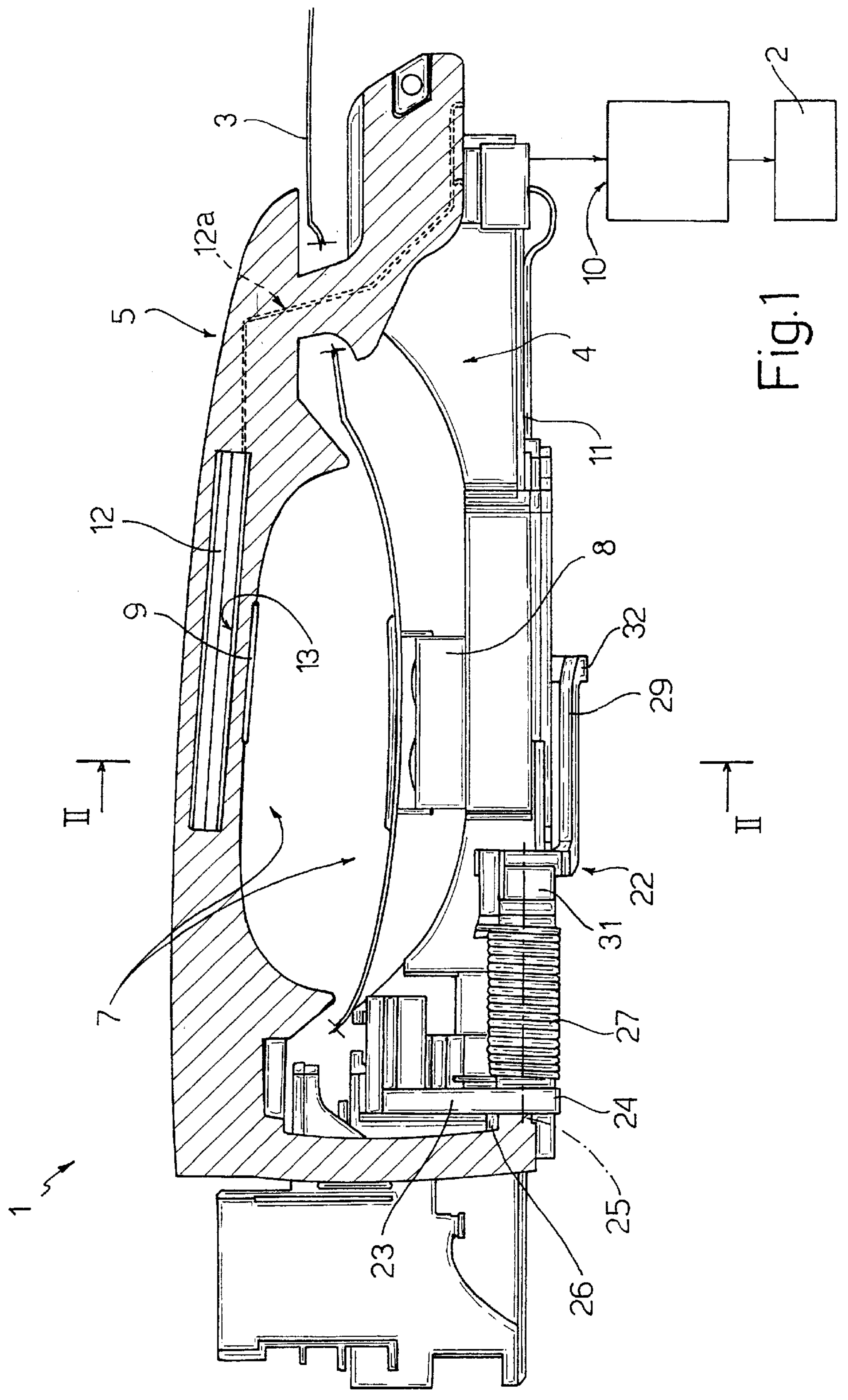
FIG. 1 shows a section of a preferred embodiment of the handle according to the present invention.

Number 1 in FIG. 1 indicates as a whole a handle for controlling a lock 2—shown schematically in FIG. 1—of a door 3 of a vehicle (not shown). Handle 1 comprises a connecting structure 4 for connection to door 3; and a hollow control lever 5 hinged to connecting structure 4 and which, in use, is turned manually by a user to open respective lock 2.

Handle 1 also comprises a known detecting device 7 for detecting the presence of the user's hand between connecting structure 4 and lever 5. In the particular example described, device 7 comprises a known emitting member 8 connected integrally to structure 4 to direct towards an intermediate portion of lever 5 a light beam impinging on a known mirror body 9 fitted integrally to lever 5. Device 7 is connected electrically by a cable 11 to a known control unit 10—also shown schematically—which acts in known manner on lock 2 to set lock 2 to a safety-off mode.

As shown in FIG. 1, handle 1 also comprises a respective electric aerial 12 which, in the particular example described, is housed entirely inside a sealed chamber 13 formed in lever 5 and substantially facing emitting member 8. Aerial 12 is connected to unit 10 by a cable 12*a* extending through lever 5, and provides for reading an identification code carried by the user, and, in response to the code being read, for emitting a signal to enable or alert unit 10.

Figure 2:
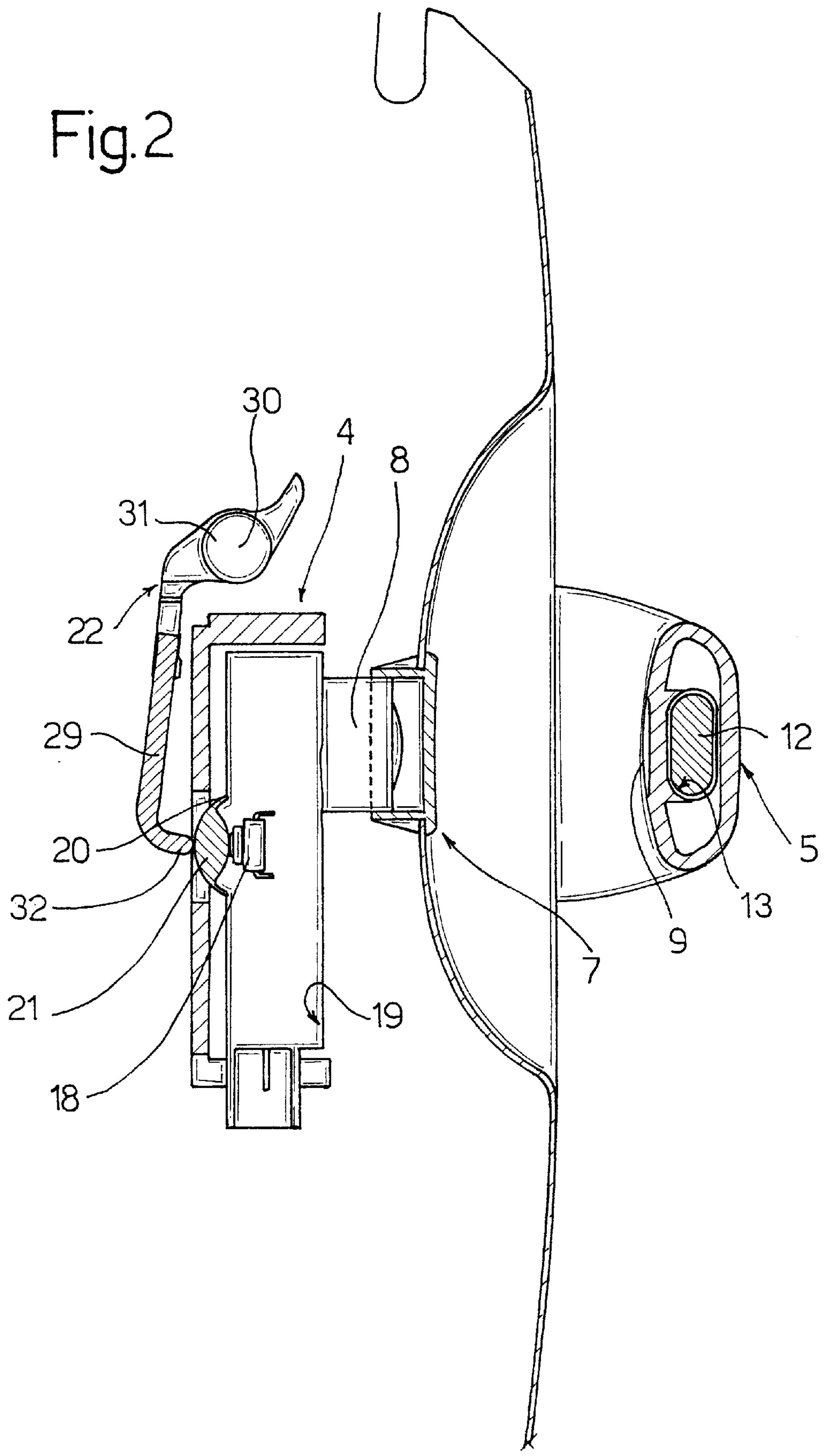
FIG. 2 shows a larger-scale section along line II—II in FIG. 1.

As shown, in particular, in FIG. 2, handle 1 also comprises a pushbutton switch 18 connected to aerial 12 via unit 10 and parallel to the device 7-unit 10 assembly to set lock 2 to the safety-off mode. More specifically, switch 18 is housed in a sealed chamber 19 formed in structure 4 and having an inlet opening 20 closed by an elastically deformable seal 21.

Switch 18 is activated by turning the handle by means of a mechanical transmission 22 (FIG. 1) interposed between control lever 5 and pushbutton 18.

In the particular example described, mechanical transmission 22 comprises a lever 23, a portion 24 of which is connected to structure 4 in an axially fixed position so as to rotate about a hinge axis 25, and an opposite portion of which rests against a projection 26 of lever 5, and is maintained contacting projection 26 by the action of a torsion spring 27 extending coaxially with axis 25.

Transmission 22 also comprises an arm 29, an end portion 30 of which is connected integrally to lever 23 by a pin 31 coaxial with axis 25, and an opposite end portion 32 of which extends facing seal 21 and, in use, acts on seal 21 to activate switch 18.

Handle 1 according to the present invention operates as follows. As the user approaches the vehicle, aerial 12 reads, in known manner, the identification code carried by the user, and supplies unit 10 with a recognition signal to enable or alert unit 10. At this point, upon the user's hand being inserted between structure 4 and lever 5, the light beam emitted by emitting member 8 is cut off; device 7 accordingly supplies a signal to unit 10 which, in known manner, sets the one lock 2 to safety-off mode; and the user turns lever 5 to release lock 2 and so open door 3.

In the event of a fault on device 7, rotation of lever 5 by the user rotates arm 29 about axis 25 so as to activate switch 18 and immediately release the safety device of lock 2.

The advantages of handle 1 will be clear from the foregoing description.

In particular, unlike known solutions, handle 1 provides for only opening the door 3 to which it is connected, as opposed to all the other doors on the vehicle. This is substantially due to each handle 1 comprising a respective electric recognition aerial carried by respective lever 5 to read the user identification code, and a respective unit 10 for only releasing the safety device of the lock 2 relative to handle 1.

Providing each handle with a respective electric aerial and respective safety-release unit therefore provides a straightforward solution to the theft problem involved in releasing the safety devices of all the vehicle locks at the same time.

Moreover, being extremely straightforward in design, handle 1 described provides for a high degree of efficiency and reliability, which are further enhanced by switch 18, which, even in the event of device 7 malfunctioning, provides for releasing the safety device of respective lock 2 and so opening door 3.

Moreover, providing an aerial and a control unit on the handle increases response time with respect to known solutions, i.e. reduces the wait time between insertion of the hand and release of the safety device of the lock, thus eliminating the "[1]wall effect" typical of known solutions due to the delay in releasing the safety devices of the locks.

Clearly, changes may be made to handle 1 as described and illustrated herein without, however, departing from the scope of the present invention.

In particular, aerial 12 may be fitted to a portion of handle 1 other than that shown by way of example; aerial 12 may be other than as described, e.g. to adapt to different geometrical characteristics of the supporting handle 1; detecting device 7 of handle 1 described may be replaced by a different type of detecting device; and a different type of mechanical transmission 22 may be provided for activating pushbutton switch 18 when control lever 5 is turned.

Moreover, switch 18 and respective transmission 22 of handle 1 described may either be dispensed with or constitute an alternative to detecting device 7.

Finally, switch 18 of handle 1 described may also be used to release the lock, in the event the lock is released electrically like the safety device.

We claim:

1. A handle (1) for controlling a lock (2) of a vehicle door (3), comprising a connecting structure (4) for connection to a supporting body of the vehicle; a movable control member (5) connected to said connecting structure (4) and activated, in use, by the hand of a user; detecting means (12) for detecting a user identification code and emitting a consent signal; and first control means (7,10; 18,22) connected to said detecting means (12) for setting said lock (2) to a safety-off mode upon a consent signal being received from said detecting means (12); wherein said detecting means (12) comprise an electric aerial housed in a sealed chamber (13) of said movable control member (5).

2. A handle as claimed in claim 1, characterized in that at least some of said first control means (7,10; 18,22) are carried by said connecting structure (4).

3. A handle as claimed in claim 1, characterized by also comprising second control means (7,10; 18,22) activated by said detecting means (12) to set said lock (2) to a safety-off mode.

4. A handle as claimed in claim 3, characterized in that said second control means (7,10; 18,22) are in parallel with said first control means (7,10; 18,22).

5. A handle as claimed in claim characterized in that said first control means (7,10; 18,22) comprise emitting means (8) for emitting a light beam.

6. A handle as claimed in claim 3, characterized in that said second control means comprise switch means (18); and a mechanical transmission (22) interposed between the movable control member (5) and said switch means (18) to activate said switch means (18).

7. A handle as claimed in claim 6, characterized in that said mechanical transmission (22) comprises at least one lever (23) connected to the connecting structure (4) and rotated about a hinge axis (25) by said movable control member (5).

8. A handle as claimed in claim 7, characterized in that said mechanical transmission (22) also comprises a control arm (29) connected integrally to said lever (23) so as to rotate about said axis (25) and acting on said switch means (18).

9. A handle as claimed in claim 6, characterized in that said connecting structure (4) comprises a sealed chamber (19) housing at least said switch means (18).

* * * * *